United States Patent [19]
Mott et al.

[11] 3,944,274
[45] Mar. 16, 1976

[54] BALE HANDLING DEVICE

[75] Inventors: Richard H. Mott; Gary L. Erlenbusch, both of Sioux Falls, S. Dak.

[73] Assignee: Du-Al Manufacturing Company, Sioux Falls, S. Dak.

[22] Filed: May 3, 1974

[21] Appl. No.: 466,620

[52] U.S. Cl. .............. 294/88; 214/147 G; 294/107
[51] Int. Cl.² .................................................. B66C 3/04
[58] Field of Search...... 294/61, 67 R, 67 BC, 86 R, 294/87.22, 87.24, 87.26, 87 R, 88, 105, 107, 108, 109; 214/147 G

[56] References Cited
UNITED STATES PATENTS

| | | | |
|---|---|---|---|
| 2,412,845 | 12/1946 | Stevens | 294/107 X |
| 2,962,177 | 11/1960 | Pridgeon | 214/147 G |
| 3,112,136 | 11/1963 | Hammond | 294/88 X |
| 3,220,760 | 11/1965 | Buchik et al. | 294/87.24 X |
| 3,420,564 | 1/1969 | Jensen | 294/67 R |

Primary Examiner—John J. Love
Assistant Examiner—Johnny D. Cherry
Attorney, Agent, or Firm—Hill, Gross, Simpson, Van Santen, Steadman, Chiara & Simpson

[57] ABSTRACT

A bale handling device, more particularly a bale pickup device, includes a plurality of squared C-shaped hooks which are individually pivotally mounted between pairs of elongate support members and pivotally mounted to actuating members for pivoting into a raised position out of engagement with the bales and a lowered position into engagement with the bales. Forces are applied via the actuating members to raise and lower the hooks by a pair of operating members which connect the actuating members to the piston end and the free end of a hydraulic cylinder. The cylinder is not fixed, but is free to float, effecting force equalization and preventing damage to the mechanism if an obstruction is encountered.

11 Claims, 6 Drawing Figures

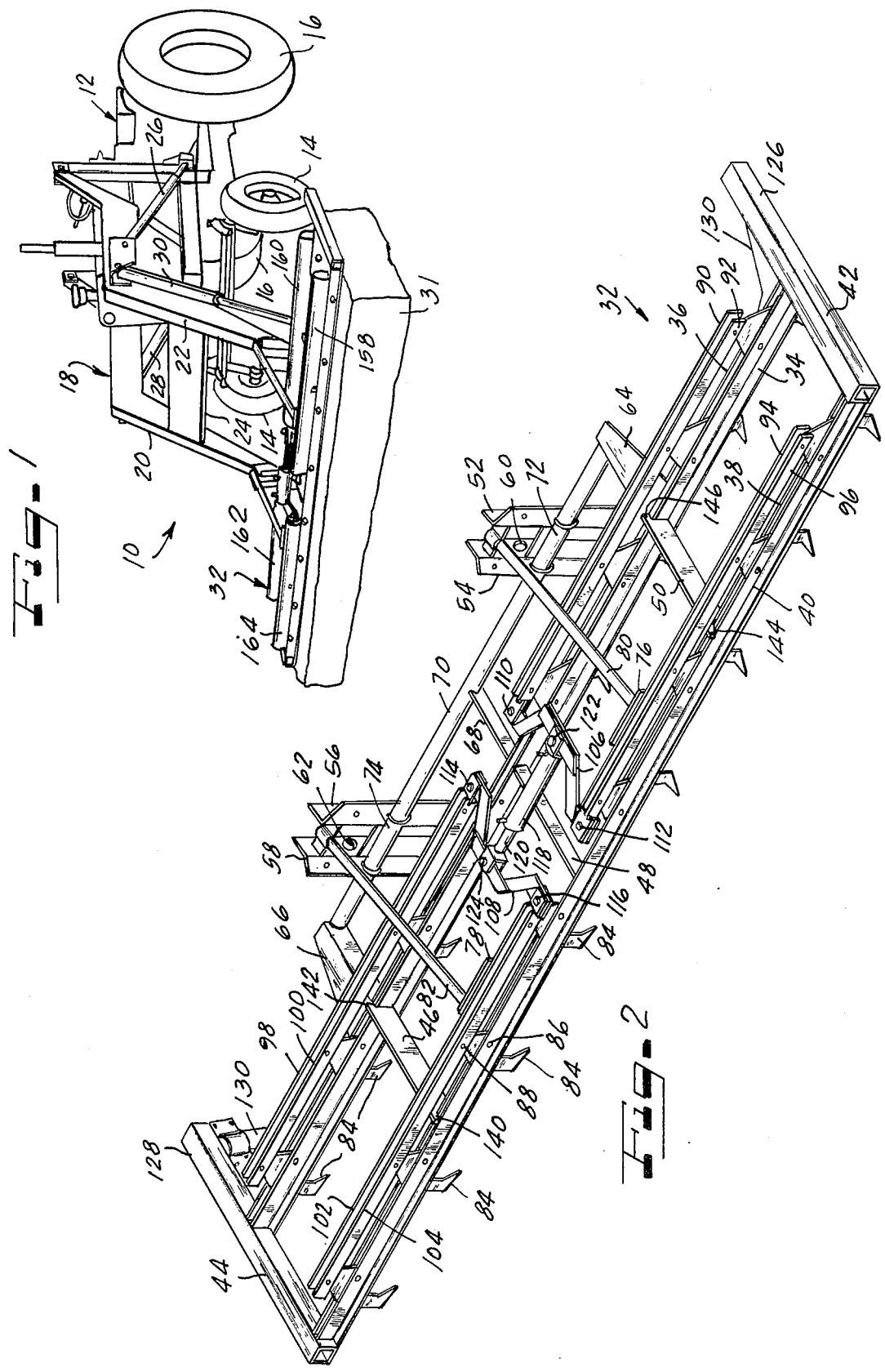

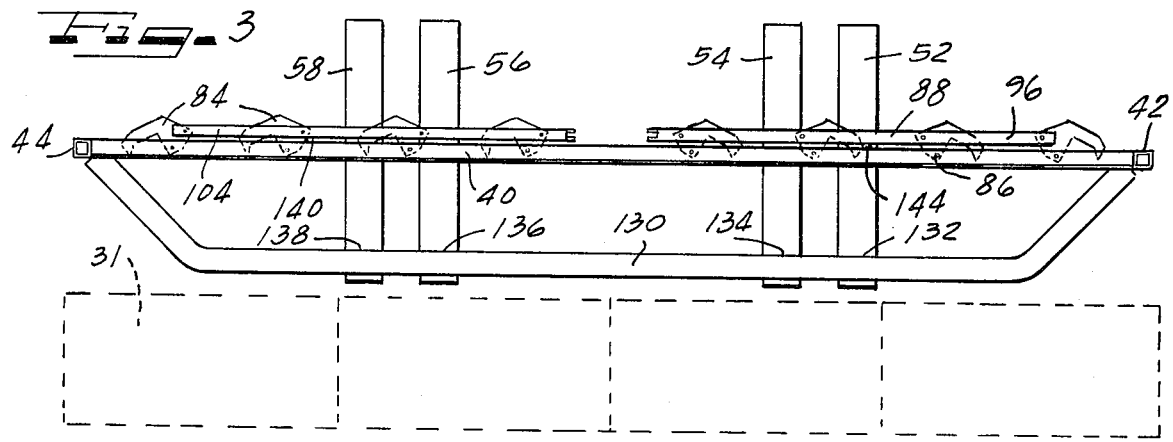
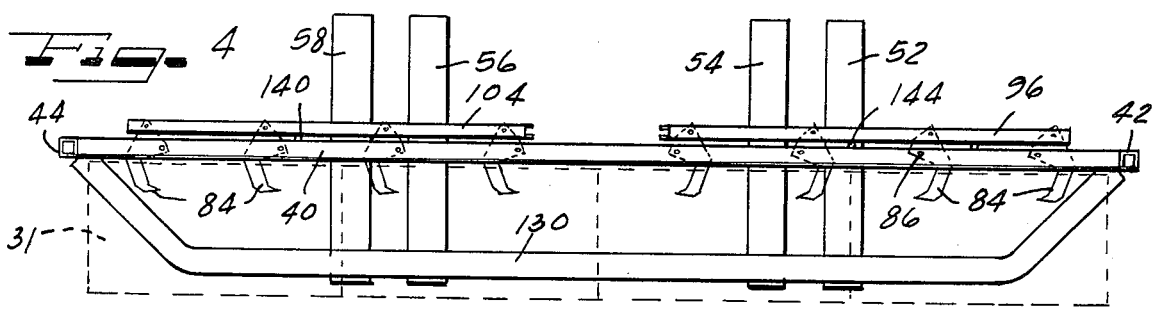
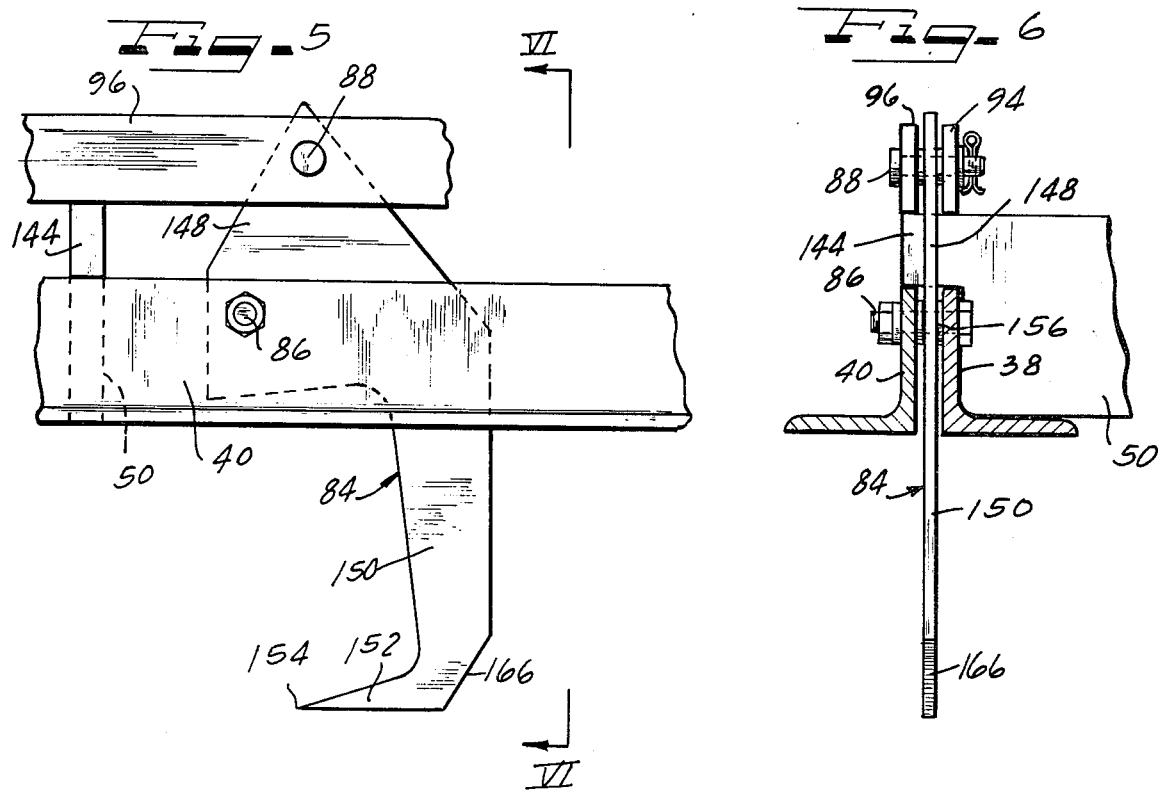

BALE HANDLING DEVICE

BACKGROUND OF THE INVENTION

1. Field of the Invention

This invention relates to bale handling systems, and is more particularly concerned with a bale handling mechanism for a tractor mounted front end loader.

2. Description of the Prior Art

As is well known to those skilled in the art hay bales which are loosely positioned with respect to each other are difficult to pick up, transfer and stack. An attendant disadvantage is that loosely positioned bales cause loose stacks in which the material may become damaged due to the effects of snow, rain or the like.

Various structures have been used by the art to handle bales. One such device is shown in U.S. Pat. No. 3,420,564, Doyne A. Jensen. The Jensen apparatus includes a plurality of horizontally extending, rotatably mounted rods each of which carry a plurality of arcuately shaped tines which are rotated into and out of engagement with the bales by a lever mechanism under the control of a hydraulic cylinder. In the apparatus disclosed by Jensen, the hydraulic cylinder is pivotally connected to a lever arm which is in turn pivotally connected to a fixed part of the frame, while the piston of the cylinder is similarly connected to a second lever arm which is pivotally connected to a fixed part of the frame. As disclosed by Jensen, the positions at which the cylinder and its piston are connected to the respective pivotal members is important in that it determines the amount of movement required by the piston to rotate the arcuate tines a desired amount. With such an operating mechanism, however, when uneven forces are encountered in the bale across the width of the bale loading mechanism, engagement between some of the tines and the bales may be incomplete and therefore somewhat ineffective so that the bales cannot be properly handled and the mechanism may be damaged. These and other disadvantages are present with such structure and applicants structure is different than the structure of the above patent and other prior art.

SUMMARY OF THE INVENTION

The primary object of the present invention is to provide a new and improved bale handling system for connection to the forward end of a tractor mounted loader.

A more specific object of the invention is to provide a bale handling mechanism which equalizes the engagement forces encountered in forcing bale handling hooks into bales.

Another object of the invention is to provide a bale handling mechanism in which the engagement forces are more directly applied to the bale engaging hooks than in mechanisms heretofore known.

According to the invention, a bale handling mechanism comprises frame members, preferably angle iron members, with tubular end supports, adjustable mounting brackets and a series of individually mounted bale engaging hooks. Each hook is mounted on a hardened steel bushing which makes hook replacement a simple and inexpensive operation. The hooks are actuated in groups of four by a simple force distributing actuating mechanism.

The actuating mechanism comprises four bars, or four pairs of bars, which extend lengthwise of the mechanism, transversely of the direction of movement of the tractor, over the hooks with each bar (or pair of bars) pivotally attached to four hooks. The actuating bars are pivotally mounted to two operating bars positioned perpendicularly to the actuating bars. The actuating bars operate against stops to control the position of the hooks in the lowered and raised positions.

A hydraulic cylinder which is actuated by the tractor or auxiliary hydraulic system is pivotally mounted between the two operating bars. This arrangement of pivotally mounted linkages allows each actuating bar to act independently, thereby equalizing forces and reducing damage to the mechanism from obstructions which may be encountered in the hay bales.

The bale handling system or pick-up device is positioned over a group of eight properly accumulated bales. The hydraulic cylinder is operated to extend its ram and, via the operating bars and actuating bars, rotate the hooks into the bales to compress and secure the bales for pick up and transport. The inner portion of the hook point is positioned perpendicularly to the force required to hold the bale.

The entire group of bales can be stacked in the field or transported to a wagon or other haulage vehicle. When the group of bales is properly positioned, the cylinder is operated to retract its piston and, via the operating and actuating bars, to pivotally withdraw the hooks from the bales to release the bales.

A bale handling system or pick-up device constructed in accordance with the principles of the present invention includes the following advantages:

1. Easy replacement of individually mounted hooks;
2. A force distributing operating mechanism;
3. A simple actuating mechanism with few moving parts;
4. A force equalization mechanism designed to reduce damage from hook obstructions;
5. A tubular and angle iron frame structure for strength;
6. The actuating mechanism may easily be shielded for safety;
7. A low silhouette, compact unit for ease in shipping;
8. The mechanism mounts on front end loaders;
9. The load is positioned close to the tractor;
10. The mechanism compresses bales for compact stacking;
11. The mechanism easily handles four or eight bales; and
12. The mechansim uses a small hydraulic cylinder.

BRIEF DESCRIPTION OF THE DRAWINGS

Other objects, features and advantages of the invention, its organization, construction and operation will be best understood from the following detailed description of a preferred embodiment of the invention taken in conjunction with the accompanying drawings, on which:

FIG. 1 is a perspective view of a bale handling system mounted on the front end of a tractor mounted loader;

FIG. 2 is a perspective view of the bale handling mechanism of FIG. 1 shown in much greater detail;

FIGS. 3 and 4 are longitudinal elevations of the mechanism of FIG. 2 specifically showing the hooks in the raised and lowered positions, respectively;

FIG. 5 is an enlarged detailed view of a portion of the apparatus of FIG. 4 showing the hook structure in greater detail and specifically showing an actuating bar stop; and FIG. 6 is a sectional view taken substantially along the line VI—VI of FIG. 5.

DESCRIPTION OF THE PREFERRED EMBODIMENT

Referring to FIG. 1, a farm implement is generally illustrated at 10 as comprising a tractor 12 mounted on a pair of front wheels 14 and a pair of rear wheels 16 and carrying a loader 18.

The loader 18 may be of any suitable design, and as illustrated may include a pair of forwardly extending pivotally mounted arms 20 and 22 spaced and braced by means of a transverse member 24 and raised and lowered by a pair of hydraulic cylinders 26 and 28. For operating work implements mounted at the distal ends of the arms 20 and 22 at least one hydraulic cylinder 30 is provided.

A work implement 32, here a bale pick-up device constructed in accordance with the principles of the present invention, is mounted at the distal ends of the arms 20 and 22 for grasping, compacting and lifting a plurality of hay bales 31. Ordinarily, a bale handling system such as described above will be operated behind a bale accumulator which gathers, accumulates and releases specified numbers of bales, usually four or eight, in a generally aligned side-by-side relationship.

Referring to FIG. 2, the pick-up device 32 is illustrated in greater detail as comprising a first pair of elongate, transversely extending members 34 and 36 which may advantageously be angle irons, spaced from a similar pair of elongate, transversely extending members 38 and 40. Each pair of angle irons 34, 36 and 38, 40 are spaced apart and secured at the opposite ends thereof by means of a first tubular member 42 and a second tubular member 44, and spaced and braced intermediate the tubular members at about each quarter of the length of the pick-up device 32 by a plurality of members 46, 48 and 50.

In order to mount the pick-up device to the loader arms 20 and 22, pairs of spaced vertical members 52, 54 and 56, 58 are provided and adapted for connection to the arms 20 and 22 by pin-type connections which include apertures, such as indicated at 60 and 62. Advantageously, these connections may be pivotal connections so that the cylinder 30, or a pair of such cylinders, may be pivotally attached to the lower end of the vertically oriented members to effect a pivotal lifting and lowering movement of the pick-up device.

The pick-up device 32 includes a pair of members 64 and 66 extending rearwardly of the brace members 46 and 50 and a member 68 extending rearwardly of the brace 48 and connected to an elongate member 70, here illustrated in the form of a round or tubular member. The member 70 is attached to the vertically oriented members 52, 54 at 72 and to the vertically oriented members 56, 58 at 74 to support the rear side of the device.

The forward side of the device is supported by structure which includes a pair of members 76 and 78. An upwardly and rearwardly extending member 80 is connected between the plate 76 and the upper ends of the vertically oriented members 52 and 54, while a similar upwardly and rearwardly extending member 82 is secured between the member 78 and the upper ends of the vertically oriented members 56 and 58.

The connections to secure the aforementioned elements together may be effected by welding or the like, or suitable fastening means such as bolts may be employed as desired.

The individual members of each pair of members 34, 36 and 38, 40 are spaced apart (FIG. 6) and receive therebetween a plurality of bale engagement hooks 84. In the specific example illustrated in FIG. 2, eight hooks are positioned between each pair of such members with four of each set of eight hooks directed toward the center of the device. Each hook 84 is pivotally mounted to the respective elongate members at 86 and further pivotally mounted to actuating members at 88, as will be described hereinbelow.

In order to pivot the hooks 84 into and out of engagement with the bales, a plurality of actuating members are provided. Single actuating members may be provided; however, in the embodiment illustrated in FIG. 2 pairs of actuating members 90, 92; 94, 96; 98, 100 and 102, 104 are provided for each set of four hooks 84.

A U-shaped operating member 106 is connected to the pair of actuating members 90 and 92 at 110 and to the pair of actuating members 94, 96 at 112. By the same token a second U-shaped operating member 108 is connected to the pair of actuating members 98, 100 at 114 and to the pair of actuating members 102, 104 at 116.

A hydraulic cylinder 118 is provided to control the movement of the operating members 106 and 108. The cylinder 118 has its free end pivotally connected at 122 to the operating member 106 and has its piston 120 pivotally connected at 124 to the operating member 108.

The foregoing structure for raising and lowering the hooks provides several advantages. First of all, the engagement and withdrawal forces are applied in a substantially straight line directly to each hook of each set of four hooks. Secondly, the non-fixed, freely floating cylinder provides for an equalization of forces between the hooks operated via the member 106 and the hooks operated via the member 108 so that upon encountering an obstruction, the hooks on the obstruction encountering side do not experience excessively high forces applied thereto, the forces being transferred to the other hooks.

The tubular members 42 and 44 include respective rearwardly extending portions 126 and 128 which secure the ends of a bale alignment bar 130. As may be seen in FIGS. 3 and 4, the bar 130 may advantageously be connected to the vertically oriented members 52, 54 and 56, 58, as by welding, to strengthen the structure and provide a means of aligning the rearward faces of the bales prior to engagement thereof with the hooks 84.

Referring to FIGS. 3 and 4, FIG. 3 illustrates the pick-up device 32 above and to the rear of a plurality of bales 31 immediately prior to engagement of the bales for transport and stacking, while FIG. 4 illustrates the pick-up device lowered and with the hooks lowered into engagement within the bales 31. In FIGS. 3 and 4 the cylinder has been omitted for clarity and to illustrate that a plurality of stops 140, 142 and 144, 146 may be provided to prevent excessive pivoting of the hooks 84. In FIG. 3, for example, the actuating members at the connections to the operating members strike the stops to prevent further upward rotation of the hooks. Since the arc of travel is symmetrical, in FIG. 4 the actuating members strike the stops when the points of the hooks are directed perpendicularly to the force required to hold the bales. The stops may be constructed in many forms and have only been shown here as extensions of the members 46 and 50 for purpose of illustration. Referring to FIGS. 5 and 6, a stop 144 is illustrated as being carried on the elongate member 40, and extends, via the member 50, rearwardly across the device to the elongate member 36. A hook 84 is illustrated in FIGS. 5 and 6 as being pivotally mounted between the elongate members 38 and 40. As mentioned above, the hooks 84 may be mounted to advantage on a hardened steel bushing which makes hook replacement a simple and inexpensive operation. Such a bushing is illustrated at 156. A similar pivotal mount may be applied for the pivotal connection 88 to the actuating members.

Referring again to FIG. 1, the actuating members 90–104 and the greater portions of the upper edges of the elongate members 34–40 are covered with shields 158–164 to prevent injury to the mechanism and to operating personal.

In operation, the tractor is driven up to a series of aligned bales, the cylinders 26 and 28 are operated to lower the arms 20 and 22 to position the member 130 along the rear faces of the bale and the cylinder 30 may be operated to properly orient the lower faces of the members 34–40 along the upper surfaces of the bales. The cylinder 118 is then operated to move the operating levers 106 and 108 apart and, via the actuating members 90–104, rotate the hooks 84 into engagement with the bales until the actuating members contact the stops 144 and 146. The loader cylinders may then be operated to raise the bales off the ground for transport and stacking.

Upon placement of the bales in the proper position on a stack, the cylinder 118 is operated to retract the piston 120 and move the operating members 106 and 108 toward each other. This effects rotation of the hooks to their upward position and disengagment with the bales. Rotation of the hooks may continue until such time as the actuating members strike the stops 140, 142, 144 and 146. The loader cylinders, particularly the cylinders 26 and 28, may then be operated to remove the pick-up device 32 from the stack.

Referring again to FIGS. 5 and 6, each hook is designed in the general form of a squared C and comprises a first portion 148 for pivotal connection to the elongate members and to the actuating members, a second portion 150, and a third portion 152 which extends substantially horizontally when the hook is in its lower position and terminates in a point 154. Each hook further comprises an angular edge 166 opposite the point 154 to allow easy withdrawal from the bales.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A bale handling device for connection to a loader, comprising:
    an elongate frame including means for attaching said frame to said loader;
    a plurality of bale engaging hooks individually pivotally mounted on said elongate frame; and
    pivoting means pivotally connected to each of said hooks and operable to pivot said hooks between lowered and raised positions to respectively engage and disengage said bales, said pivoting means comprising:
        first means pivotally connected to each of said hooks of a first group of said plurality of hooks,
        second means pivotally connected to each of said hooks of a second group of said hooks, said hooks of said first and second groups of hooks directed to face each other and said first and second means extending in the same direction, and
        a hydraulic cylinder including an extensible piston, said piston connected to said first means and the free end of said cylinder connected to said second means, said cylinder operable to move said first and second means forward and away from each other to pivot said hooks, comprising:
            a pair of spaced apart members each pivotally connected to the hooks of a sub-group of the respective group of hooks, and
            an operating member connected between said spaced apart members and to the respective one of the free end of said cylinder and said piston.

2. A bale handling device for connection to a loader, comprising:
    a frame including a first pair of spaced elongate members, a second pair of spaced elongate members spaced from, connected to and extending parallel to said first pair of elongate members, and means for connecting the frame to a loader;
    first, second, third and fourth groups of hooks, each of said hooks including a point, said hooks of said first and second groups of hooks pivotally mounted between and to said first pair of elongate members for movement between lowered and raised positions with the point of each hook directed inboard of the device in the lowered position, and said hooks of said third and fourth groups of hooks pivotally mounted between and to said second pair of elongate members with the point of each hook likewise directed inboard of the device; and
    hook pivoting means pivotally connected to each of said hooks and operable to pivot said hooks between the lowered and raised positions to respectively engage and disengage bales.

3. A bale handling device according to claim 2, wherein each of said elongate frame members comprises;
    an angle iron including first and second legs, the first legs of each pair spaced from and parallel to each other with the respective hooks disposed therebetween, and the second legs of each pair disposed substantially co-planar to engage the upper surfaces of the bales.

4. A bale handling device according to claim 2, wherein said hook pivoting means comprises:
    first, second, third and fourth actuating members each pivotally connected to the hooks of a respective group of hooks;
    first and second operating members, said first operating member connected to said first and third actuating members, and said second operating member connected to said second and fourth actuating members; and a hydraulic cylinder including a free end connected to said first operating member and an extensible piston connected to said second operating member.

5. A bale handling device according to claim 4, comprising:
shield means covering each of said actuating members.

6. A bale handling device according to claim 4, comprising:
stop means mounted on said frame to limit the movement of said actuating members.

7. A bale handling device according to claim 2, wherein said hook pivoting means comprises:
first, second, third and fourth pairs of actuating members, each pair of actuating members pivotally connected and extending on each side of the hooks of a respective group of hooks;
first and second operating members, said first operating member connected to said first and third pairs of actuating members, and said second operating member connected to said second and fourth pair of actuating members; and
a hydraulic cylinder including a free end connected to said first operating member and an extensible piston connected to said second operating member.

8. A bale handling device according to claim 7, comprising
shield means covering each of said pair of actuating members.

9. A bale handling device according to claim 2, wherein each of said hooks is generally shaped as a squared C and comprises:
a first portion pivotally connected to the respective elongate members;
a second portion extending substantially perpendicularly from said first portion; and
a pointed third portion extending from said second portion substantially parallel to said first portion.

10. A bale handling device according to claim 9, wherein each of said hooks comprises:
an edge at the junction of said second and third portions and generally opposite said point and directed at an angle to said second and third portions to ease disengagement from the bales.

11. A bale handling device for connection to a loader, comprising:
a frame including means for connecting said frame to the loader, a first pair of spaced elongate members, and a second pair of spaced elongate members spaced from, connected to and extending parallel to said first pair of elongate members,
each of said elongate members including a flat lower surface and a wall perpendicular to said flat lower surface,
first, second, third and fourth groups of pointed hooks, said hooks of said first and second groups of hooks individually pivotally mounted between and to said walls of said first pair of elongate members for movement between lowered and raised positions with the point of each hook directed inboard of the device in the lowered position, and said hooks of said third and fourth groups of hooks individually pivotally mounted between and to said walls of said second pair of elongate members with the point of each hook likewise directed inboard of the device, the points of said hooks being raised upwardly to at least the level of said flat lower surfaces when moved to the raised position, and
hook pivoting means pivotally connected to each of said hooks and operable to pivot said hooks between the lowered and raised positions to respectively engage bales and strip bales from the device.

* * * * *